United States Patent [19]
Dahlgren

[11] Patent Number: 5,784,003
[45] Date of Patent: Jul. 21, 1998

[54] NETWORK SWITCH WITH BROADCAST SUPPORT

[75] Inventor: Kent Blair Dahlgren, San Jose, Calif.

[73] Assignee: I-Cube, Inc., Campbell, Calif.

[21] Appl. No.: 624,686

[22] Filed: Mar. 25, 1996

[51] Int. Cl.[6] .................. H04Q 19/00; G05B 23/02; G06F 13/00
[52] U.S. Cl. .................. 340/825.79; 340/825.79; 395/280; 395/311; 395/312
[58] Field of Search .................. 340/825.79; 395/280, 395/311, 312, 410, 421.11; 370/411, 351, 389, 422, 423, 424

[56] References Cited

U.S. PATENT DOCUMENTS

| | | | |
|---|---|---|---|
| 3,655,920 | 4/1972 | Laane | 379/292 |
| 3,670,307 | 6/1972 | Arnold et al. | 364/241.2 |
| 3,970,994 | 7/1976 | Jenny | 395/311 |
| 4,814,762 | 3/1989 | Franaszek | |
| 4,947,388 | 8/1990 | Kuwahara et al. | |
| 5,311,593 | 5/1994 | Carmi | 380/23 |
| 5,412,648 | 5/1995 | Fan | |
| 5,428,800 | 6/1995 | Hsieh et al. | |
| 5,430,442 | 7/1995 | Kaiser et al. | |
| 5,469,438 | 11/1995 | Baumert et al. | 370/85.11 |
| 5,657,383 | 8/1997 | Gerber et al. | 379/266 |
| 5,673,254 | 9/1997 | Crayford | 370/231 |

OTHER PUBLICATIONS

Yuval Tamir and Hsin-Chou Chi, *IEEE Transactions on Parallel and Distributed Systems*, vol. 4, No. 1, 1993, "Symmetric Crossbar Arbiters for VLSI Communication Switches," pp. 13-27.

*Primary Examiner*—Michael Horabik
*Assistant Examiner*—Anthony A. Asongwed
*Attorney, Agent, or Firm*—Smith-Hill and Bedell

[57] ABSTRACT

A local area network switch includes input and output ports for receiving and transmitting broadcast and unicast data transmissions from and to corresponding network stations and a crosspoint switch for selectively routing data transmissions between the ports. All input ports have one connection to the crosspoint switch for forwarding incoming broadcast and unicast data transmissions to the crosspoint switch. Each output port has a unique unicast link to the crosspoint switch for receiving unicast transmissions directed solely to its corresponding network station. All output ports also share a second broadcast link to the crosspoint switch for receiving broadcast transmissions directed to all network stations. The crosspoint switch routes each unicast transmission from an input port only to the appropriate output port via the output port's unicast link and routes broadcast transmission from an input port to all output ports via the common broadcast link. Each output port can receive and store both unicast and broadcast transmissions routed concurrently through the crosspoint switch and can thereafter forward the stored transmissions sequentially to its corresponding network station.

19 Claims, 6 Drawing Sheets

NETWORK SWITCH WITH BROADCAST SUPPORT

BACKGROUND OF THE INVENTION

1. Field of the Invention

The present invention relates in general to a switch for routing data between network stations, and in particular to a network switch that enables any network station to broadcast or multicast a data transmission to all or a selected group of other network stations.

2. Description of Related Art

Computer networks transfer data between computers or other types of network stations. For example 10BASE-T Ethernet systems use sets of twisted pair conductors in a star network topology to connect network stations to a central hub or switch. A 10BASE-T hub is simply a repeater receiving a data packet from any one station and rebroadcasting it to all other stations. A header in the data packet indicates the intended destination station for the packet and each network station looks at the packet header to determine if it should accept or ignore an incoming packet.

Network hubs are particularly well suited for facilitating broadcast and multicast transmission. In a network providing broadcast capability, each network station not only accepts incoming data packets directed to its own unique network address, but also accepts data packets directed to a universal "broadcast" address. In a network providing multicast capability, the network assigns several addresses as "multicast" addresses. Each network station accepts incoming data directed not only to its own unique address but may also accept incoming data directed to one or more (though not necessarily all) of the multicast addresses. This allows a network to be organized into several "virtual networks" wherein each station accepts multicast transmissions from other stations within its own virtual network but not from stations assigned to other virtual networks. For example a single network may interconnect all stations in a large company but stations in separate departments such as engineering, marketing, and accounting are assigned to separate "virtual networks". A multicast transmission from one department is accepted only by stations of the same department.

A network hub easily facilitates broadcast and multicast network because it sends every transmission from any one network station to every other network station. Thus a transmitting network station wishing to broadcast or multicast a data packet simply directs the packet to the appropriate broadcast or multicast address and need not repeatedly send packets separately to the various individual network station address. However in a system employing a network hub a transmission from any one station blocks transmissions from all other stations. Thus only one network station can transmit a packet at any given time. Also every network station must examine every packet transmitted on the network even though much of the traffic is directed elsewhere.

A network switch routes a data packet only to its destination station so that each network station receives only the packet traffic directed to it. A network switch includes input and output ports for receiving and transmitting packets from and to the network stations and a switching mechanism such as a crosspoint switch for selectively routing each incoming packet from an input port to the appropriate output port. The input port determines the destination output port from the routing data included in the packet header and then requests a connection between the input port and the destination output port. When the connection is established, the input port sends the packet to the output port via the crosspoint switch. Network switches may be "non-blocking", allowing any network station to send a data packet to any other network station not currently receiving a data packet from another station. Thus several network stations can transmit data at the same time.

One main disadvantage to network switches of the prior art is that they do not handle broadcast transmissions efficiently. When an input port of a prior art network switch receives a packet directed to a broadcast address, it has two options. The input port's first option is to hold the broadcast packet and request concurrent access to every output port. When it has obtained access to all output ports, the input port forwards the broadcast packet to all output ports concurrently and then relinquishes the output ports. The disadvantage of this approach is that while it is acquiring access rights to all output ports, the input port may block packet transmission to some output ports for much longer than is needed to transmit the broadcast packet to them.

The input port's second option is to separately arbitrate for access to each output port and separately send the broadcast packet to each output port whenever the output port becomes available. This approach reduces the amount of time that the input port blocks the output ports, but the input port must transmit the packet several times and may not be able to forward other packets from the source station until the broadcast packet has been sent out to all output ports.

What is needed is a network switch that allows an input port to quickly forward a broadcast packet to all output ports without blocking packet transmissions from other input ports.

SUMMARY OF THE INVENTION

A local area network switch in accordance with the present invention includes input and output ports for receiving and transmitting broadcast and unicast data transmissions from and to corresponding network stations and a crosspoint switch for selectively routing data transmissions between the ports. Each input port is linked to the crosspoint switch for forwarding incoming broadcast and unicast data transmissions to the crosspoint switch. Each output port has a unique unicast link to the crosspoint switch for receiving unicast transmissions directed solely to its corresponding network station. All output ports share a second broadcast link to the crosspoint switch for receiving broadcast transmissions directed to all network stations. The crosspoint switch routes each unicast transmission from the receiving input port only to the appropriate output port via the output port's unicast link and concurrently routes each broadcast transmission from its receiving input port to all output ports via the shared broadcast link. Each output port can concurrently receive and store both unicast and broadcast transmissions routed and can thereafter forward the stored transmissions sequentially to its corresponding network station.

Since broadcast and unicast packets are independently routed to each output port, and since each output port can receive unicast and broadcast packets concurrently, broadcast packet transmission through the crosspoint switch does not block unicast packet transmission. Also an input port can forward a broadcast packet without having to wait for the output ports to be free of unicast packet traffic.

It is accordingly an object of the present invention to provide a network switch for efficiently routing both unicast and broadcast data transmission between network stations.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
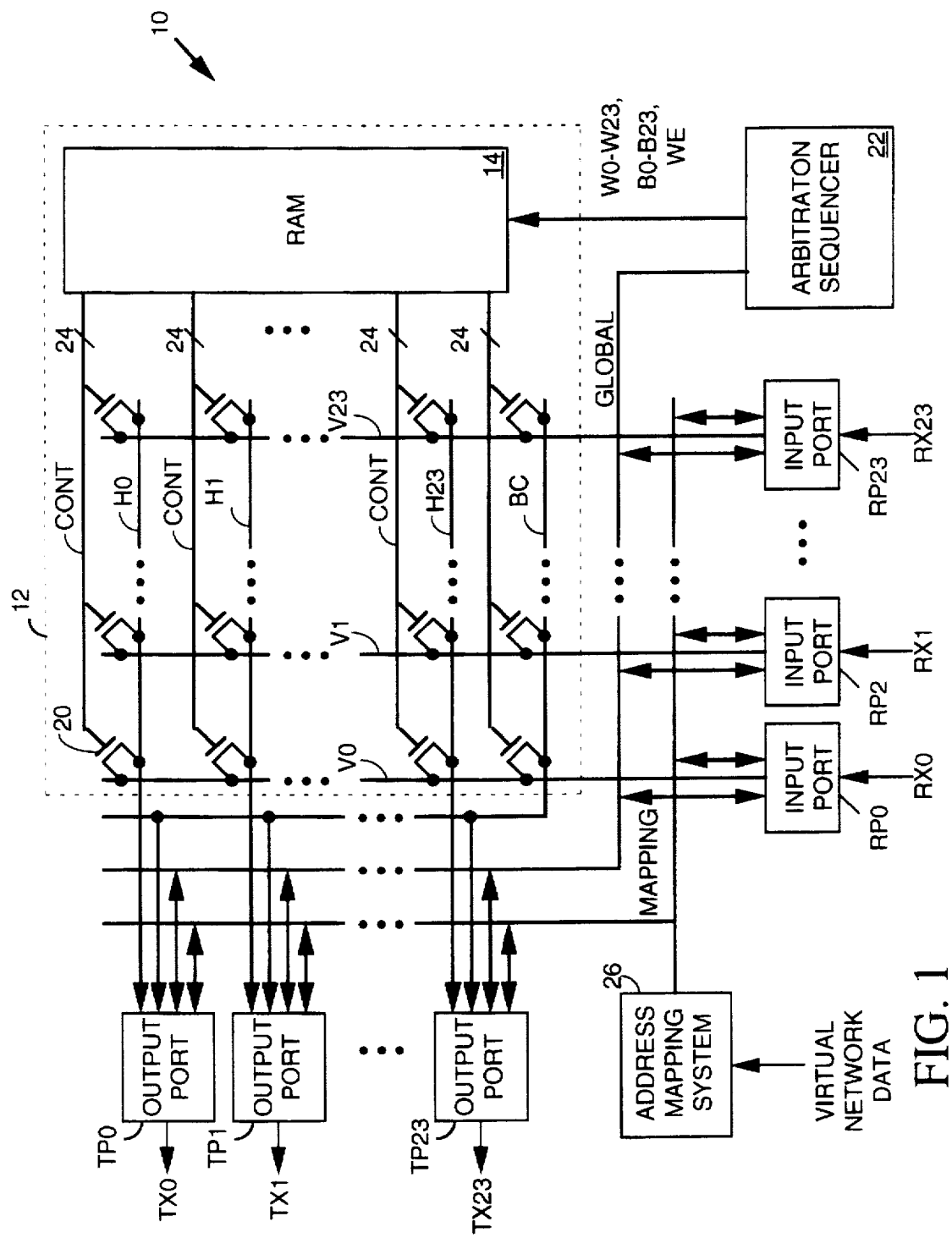
FIG. 1 illustrates a local area network switch in accordance with the present invention for routing serial data packets between up to 24 network stations.

FIG. 1 illustrates a local area network (LAN) switch 10 in accordance with the present invention for routing data transmissions between up to 24 network stations (not shown). Switch 10 receives transmissions in the form of data packets from each network station via one of serial input buses RX0–RX23 and forwards them to the network station via a corresponding one of output buses TX0–TX23. Network switch 10 includes a set of input ports RP0–RP23, each receiving incoming packets arriving on a corresponding one of input buses RX0–RX23, and a set of output ports TP0–TP23, each for forwarding transmission outward on a corresponding one of output buses TX0–TX23. A crosspoint switch 12 routes each packet received by input ports RP0–RP23 to the appropriate output ports TP0–TP23.

Unicast Packet Handling

A "unicast" data packet arriving at an input port from a source station includes a network address indicating a particular destination network station to which the packet is directed. When a unicast packet arrives at one of input ports RP0–RP23, the input port stores the packet and determines from the network address the particular output port to which the packet is to be forwarded. The input port then communicates with an arbitration sequencer 22 via a bus (GLOBAL), the input port requesting a connection through switch 12 to the destination output port. The arbitration sequencer 22 also communicates with the output ports via the GLOBAL bus to determine when each output port is "idle" (not currently receiving a data packet). When the requested output port is idle, the arbitration sequencer 22 establishes the requested connection through switch 12 and then signals the requesting input port that it may begin transmitting the packet to the destination output port via switch 12. Each input port RP0–RP23 is connected to switch 12 via a corresponding one of switch input lines V0–V23 and transmits the data packet to switch 12 via the corresponding input line. Each output port is connected to switch 12 via a corresponding switch output lines H0–H23. Switch 12 routes each unicast data packet arriving on one of input line V0–V23 to the appropriate output port via its corresponding switch output line H0–H23. After the output port receives the unicast packet it forwards it to the destination network station.

Broadcast Packet Handling

A "broadcast" data packet arriving at an input port from a source station includes routing data indicating that the packet is directed to all (or a subset of all) network stations rather than to one particular network station. When a broadcast packet arrives at one of input ports RP0–RP23, the input port stores the packet and determines the nature of the packet from the routing data. In accordance with the present invention, switch 12 has an additional "broadcast" output line BC connected in common to all output ports TP0–TP23. The input port receiving a broadcast packet communicates with arbitration sequencer 22 via the GLOBAL bus requesting a connection through switch 12 to the broadcast line BC. When the BC bus is idle (not currently conveying packet data), the arbitration sequencer 22 establishes a connection through switch 12 between the input line V0–V23 from the requesting input port and the BC bus. Sequencer 23 then signals the requesting input port that it may begin forwarding the broadcast packet concurrently to the all output ports TP0–TP23 via switch 12 and the broadcast line BC. All output ports TP0–TP23 concurrently receive and store the broadcast packet arriving on the BC. Each output port thereafter separately forwards the broadcast packet to the network station it serves.

Each output port TP0–TP23 thus has two connections to switch 12: a corresponding one of lines H0–H23 for receiving unicast packet transmission directed solely to the network station served by the port, and the BC line for receiving broadcast transmissions. With separate inputs for broadcast and unicast transmissions, each output port may concurrently receive and store both types of transmissions and then sequentially forward each transmission in turn to the corresponding network station. Thus any input port RP0–RP23 can forward a broadcast transmission concurrently to all output ports TP0–TP23 even though one or more of the output ports is busy receiving a unicast transmission from another port. Conversely, any input port can send a unicast transmission to all output ports even though all output ports are currently busy receiving a broadcast transmission from another input port.

Address Mapping

The input ports RP0–RP23 access an address mapping system 26 through a mapping bus (MAPPING). The mapping system 26 relates the network address of each network station to the particular output port TP0–TP23 to which the network station is connected. When an input port receives and stores a unicast packet, it sends the network address of the destination station included in the packet to the address mapping system 26 via the MAPPING bus. The address mapping system returns the identification code ID of the output port, for example TP1, to receive the packet. The input port RP0, then forwards the output port ID to arbitration sequencer 22 to request a connection to output port TP1 via the appropriate unicast line H1. On the other hand, when an input port receives a broadcast packet directed to a network broadcast address, it requests a connection to the broadcast line BC without accessing mapping system 26.

Virtual Networks and Multicast Transmissions

A network may be organized into several "virtual networks" wherein each station accepts transmissions from other stations within its own virtual network but not from stations assigned to other virtual networks. For example a single network may interconnect all stations in a large company but stations in separate departments such as engineering, marketing, and accounting are assigned to separate "virtual networks". In a virtual network environment a network station "multicasts" a packet to all stations of its own virtual network rather than "broadcasts" a packet to all stations of the larger, physical network. Network switch 10 efficiently handles unicast and multicast transmissions in a virtual network environment.

As shown in FIG. 1, a system supervisor supplies address mapping system 26 with data assigning the network stations to various virtual networks. As mentioned above, when an input port RP0–RP23 receives a unicast packet from a source station, it sends a destination address to mapping system 26 to be translated into an output port ID. When mapping system 26 returns the output port ID it also tells the input port whether the destination station is included in the same virtual network as the source station. If the source and destination stations are in the same virtual network, the input port forwards the unicast packet to the indicated output port. Otherwise, if the source and destination stations are not in the same virtual network, the input port discards the packet and does not forward it. When an input port receives a multicast packet directed to the network broadcast address, it requests a connection to the broadcast line BC without accessing mapping system 26.

Each multicast packet includes the network address of the source station sending the packet. When one of output ports TP0–TP23 receives a multicast packet via the broadcast line BC, it sends to mapping system 26 the network address of the multicast packet source station along with the network address of the destination station the output port serves. Mapping system 26 responds by telling the output port whether the source and destination stations are within the same virtual network. If they are in the same virtual network, the output port forwards the packet to the station it serves. If source and destination ports are not in the same virtual network, the output port discards the broadcast packet and does not forward it to the network station it serves Thus when set up to operate in a virtual network environment, switch 10 of the present invention forwards both unicast and multicast packets only to destination network stations included in the same virtual network as the source station.

Crosspoint Switch

Crosspoint switch 12 includes the set of 24 "vertical" input lines (conductors) V0–V23, each connected to a corresponding one of input ports RP0–RP23 and the set of 24 "horizontal" output lines H0–H23, each connected to a corresponding one of output ports TP0–TP23. Switch 12 also includes the output broadcast line BC connected in common to all output ports TP0–TP23. An array of CMOS pass transistors 20 each have source and drain terminals connected to one of horizontal lines H0–H23 and to one of vertical lines V0–V23. A random access memory (RAM) 14 stores 25 24-bit words and supplies a separate control signal CONT to the gate of each transistor 20. When a CONT signal is asserted, it turns on a pass transistor 20, thereby establishing a signal path between one of vertical lines V0–V23 and one of horizontal lines H0–H23 or the broadcast line BC. The state of each CONT signal supplied to a transistor 20 of the Jth row of transistors 20 is determined by a corresponding bit of a Jth data word stored in RAM 14. The arbitration sequencer 22 responds to connection requests from the input ports RP0–RP23 by writing data to RAM 14, thereby to make and break signal routing paths through switch 12.

Input Port

Figure 2:
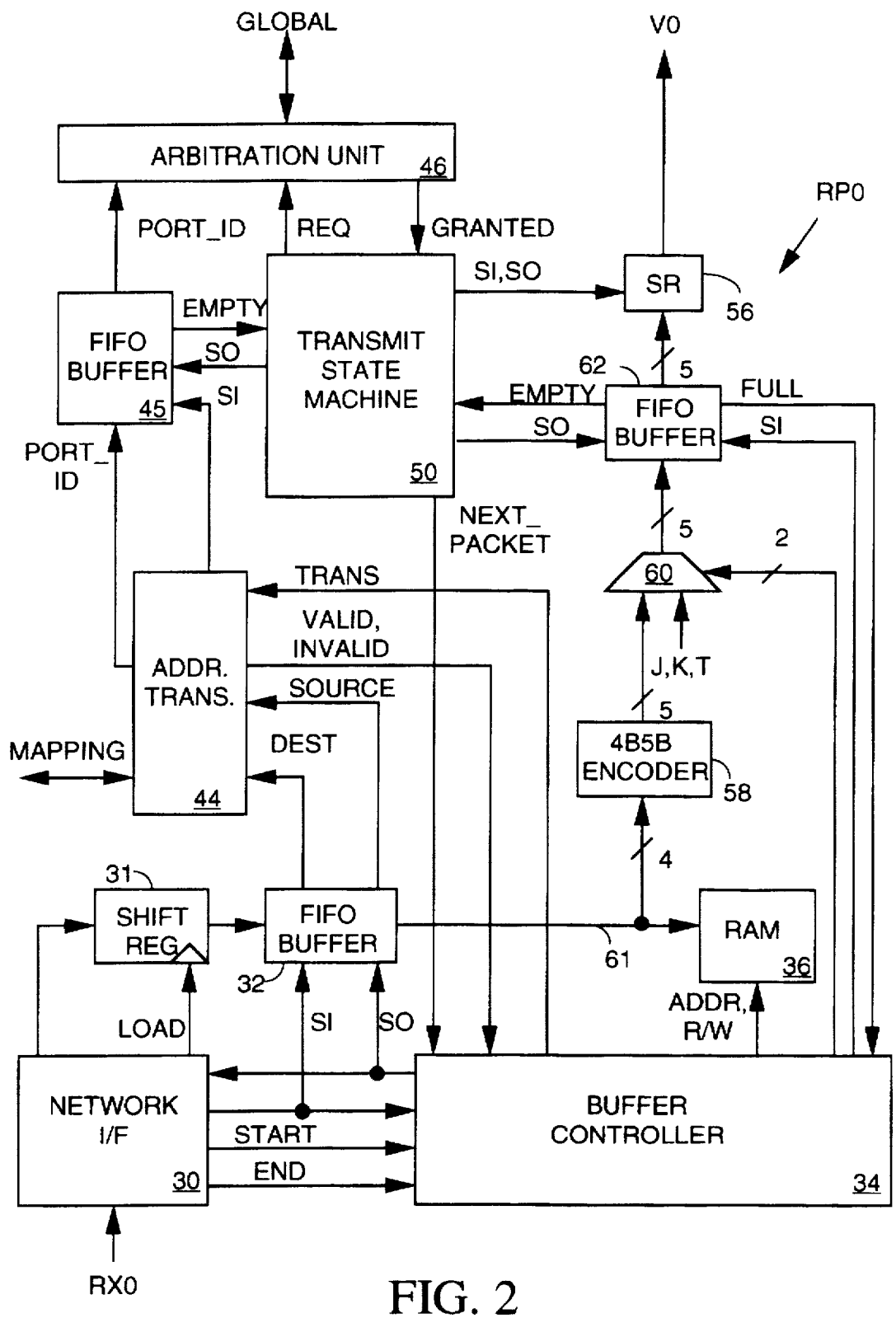
FIG. 2 illustrates an input port of FIG. 1 in more detailed block diagram form.

FIG. 2 illustrates input port RP0 of FIG. 1 in more detailed block diagram form. Input ports RP1–RP23 are similar. A network station transmits a data packet to input port RP0 in serial form via bus RX0 using Ethernet 10BASE-T protocol. The data packet, formatted as a standard Ethernet protocol data unit, is of variable length and includes the fields illustrated in Table I:

TABLE I

| Field | Field Length | Purpose |
|---|---|---|
| PREAMBLE | 7 bytes | Used for synchronizing |
| START | 1 byte | Start of frame delimiter |
| DEST | 6 bytes | Destination Network address |
| SOURCE | 6 bytes | Source Network address |
| TYPE/LEN | 2 bytes | Type or length of data field |
| DATA | 46–1500 bytes | Data field |
| CRC | 4 bytes | Frame check field |

The PREAMBLE and START fields are fixed data patterns that are the same for all packets. The DEST field indicates the network address of the station to receive the packet or indicates the network broadcast/multicast address. The SOURCE field indicates the network address of the station that transmitted the packet. The TYPE/LEN fields may indicate either the packet type or the length of the DATA field, depending on the protocol being employed. The DATA field holds the packet payload data and may be from 46 to 1500 bytes long. The CRC field is a frame check field used by the receiving station to determine whether the packet has been corrupted in transmission.

Referring to FIG. 2, a conventional 10BASE-T network interface circuit 30 receives the incoming packet arriving on input bus RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO buffer to store the nibble. Interface circuit 30 continues to load each successive nibble of the data packet into buffer 32.

When the longest stored nibble in FIFO buffer 32 is the first nibble of a data packet following the preamble, network interface circuit 30 transmits a START signal to a buffer controller 34. Buffer controller 34 controls the storage of data packets in a random access memory (RAM) 36. On receipt of the START signal, buffer controller 34 begins pulsing a shift-out signal (SO), each pulse causing FIFO buffer 32 to shift a 4-bit data nibble out to RAM 36 via a 4-bit data bus 61. RAM 36, controlled by address and read/write control signals generated by buffer controller 34, stores the packet data nibbles at sequential addresses. Network interface circuit 30 counts the nibbles of each packet it loads into FIFO buffer 32 and also counts pulses of the SO signal produced by buffer controller 34 to determine how many nibbles of the controller 34 has stored in RAM 36. After interface circuit 30 shifts the last nibble of a packet into FIFO buffer 32, it continues to count the number of nibbles the buffer controller 34 shifts out of buffer 32 and sends an END signal to controller 34 to tell it that it has acquired the last nibble of the packet. Buffer controller 34 also counts nibbles of incoming packet data as they are stored in RAM 36. After receiving the END signal from network interface 30, controller 34 stores its count in RAM 36 as a LENGTH field in a header portion of the packet. When the packet is later forwarded to an output buffer, the output buffer determines the length of the packet from the LENGTH field.

As it loads packet data into RAM 36, buffer controller 34 determines from its nibble count when the data packet's source and destination fields (SOURCE, DEST) appear in FIFO buffer 32. At that point buffer controller 34 generates a translate signal (TRANS) pulse causing an address translation circuit 44 to acquire the SOURCE and DEST data. If the packet is a unicast rather than a broadcast transmission, as indicated by the DEST data, address translation circuit 44 sends an interrupt signal to the address mapping system 26 of FIG. 2 via the MAPPING bus. The address mapping system maintains a table for translating network addresses into port IDs. On receiving the interrupt, the address mapping system obtains the SOURCE and DEST fields from translation circuit 44 as well as the ID of input/output port RP0/TP0. (The source network station that sent the packet via input port RP0 is also connected to output port TP0 for receiving network transmissions.) The address mapping system updates its mapping table to map the SOURCE field address to input/output port RP0/TP0. The mapping system uses this mapping later when any other network station sends a packet to the source station connected to port TP0.

The address mapping system 26 (FIG. 1) also translates the DEST field acquired from address translation circuit 44 into the ID of the output port to which the destination station is connected and returns the output port ID (PORT_ID) to translation circuit 44. In a virtual network environment, the mapping system 26 also tells translation circuit 44 whether the destination station is included in the same virtual network as the source station. If the destination station is a valid destination for a packet from the source station, translation circuit 44 delivers the output port ID (PORT_ID) to a FIFO buffer 45. The longest stored PORT_ID in FIFO buffer 45 is supplied to an arbitration unit 46. FIFO buffer 45 supplies an EMPTY signal to a transmit state machine 50 when it is empty and de-asserts it when it stores a port ID. State machine 50 controls the flow of data outward from input port RP0 on conductor V0 to switch 12 of FIG. 2. When state machine 50 detects FIFO buffer 45 is not empty, and port TP0 is not currently forwarding a packet via line V0, state machine 50 pulses a request signal REQ supplied to arbitration unit 46. Arbitration unit 46 then acquires the longest stored PORT_ID output from FIFO buffer 45. Later, when arbitration sequencer 22 (FIG. 1) polls input port RP0 via the GLOBAL bus to determine if input port RP0 has a pending connection request, sequencer 22 acquires the PORT_ID from arbitration unit 46. When sequencer 22 thereafter grants the request, it signals arbitration unit circuit 46 (FIG. 2) to supply a GRANTED pulse to state machine 50. State machine 50 then pulses a NEXT_PACKET signal supplied to buffer controller 34 telling controller 34 it may begin forwarding another packet stored in RAM 36 outward on the V0 line.

Buffer controller 34 then switches a multiplexer 60 to receive a hardwired 5-bit code "J" and then shifts the "J" code output of multiplexer 60 into a FIFO buffer 62. Controller 34 then switches multiplexer 60 to select a hardwired "K" code and shifts the "K" code output of multiplexer 60 into FIFO buffer 62. (As explained below, the JK code sequence marks the beginning of a data packet transmission on output line V0.) Thereafter, controller 34 switches multiplexer 60 to select the 5-bit data output of an encoder circuit 58 which converts the 4-bit data appearing on data input/output bus 61 of RAM 36 to 5-bit "4B5B" encoded form (described below). Sequencer 34 then begins sequentially reading 4-bit nibbles of the data packet out of RAM 36. As encoder 58 converts the nibbles to 5-bit 4B5B encoded form, multiplexer 60 passes the 5-bit result to a FIFO buffer 62. Sequencer 34 strobes a shift in (SI) signal causing FIFO buffer 62 to load the 5-bit data values. FIFO buffer 62 produces a FULL signal telling controller 34 when the buffer is full. The longest stored nibble in FIFO buffer 62 is delivered to a shift register 56. When FIFO buffer 62 is not empty, state machine 50 signals shift register 56 to shift in the 5-bit value from buffer 65, and then signals it to shift it out in serial form onto switch input line V0 to switch 12 of FIG. 1. Switch 12 routes the data to the appropriate output port.

As buffer controller 34 forwards packet data out of RAM 36 to FIFO buffer 62 it counts the nibbles sent and compares the count to the known length of the packet stored in the packet header. After it forwards the last nibble of the packet through encoder 58 to FIFO buffer 62, controller 34 switches multiplexer 60 to select and forward to FIFO buffer 62 a 5-bit hardwired "T" code. This code, which marks the end of the packet, passes through in FIFO buffer 62 and shift register 56 and travels outward on line V0 at the end of the data packet. When the last bit of nibble of a packet departs FIFO buffer 62, buffer 62 signals state machine 50 that it is empty. State machine 50 then initiates another connection request if FIFO buffer 45 is not empty, and waits for another GRANTED signal pulse indicating that a next connection request has been established. It then signals controller 34 with a NEXT_PACKET signal pulse indicating that it may forward the next packet stored in RAM 36.

When a unicast packet arriving from the source station is directed to a destination station not included in the same virtual network as the source station, the address mapping system 22 (FIG. 1) signals address translation unit 44 (FIG. 2) that the destination station is invalid. In that event, the address translation unit 44 does not shift the PORT_ID of the destination port into FIFO buffer 45 and no connection request results. Instead, address translation unit 44 sends an INVALID signal pulse to buffer controller 34. This tells controller 34 that it is to "discard" the last received packet. Controller 34 discards the packet by writing over it with a next received packet without forwarding it to the destination station.

The first few bits of the destination address included in an incoming broadcast/multicast packet indicate that the packet is a broadcast/multicast packet. When a broadcast/multicast packet arrives at input port RP0, address translation circuit 44 simply shifts a "broadcast line" ID into FIFO buffer 45 instead of a particular output port ID and signals buffer controller 34 that the incoming packet is valid. Translation circuit 44 does not communicate with the address translation system. The broadcast line ID shifted into FIFO buffer 45 initiates a request for a connection to the broadcast line BC. As mentioned herein above, each output port receiving the broadcast or multicast packet consults the address translation system to determine whether it should forward the packet to the destination port it serves.

4B5B Encoding

Data packets are encoded before being transmitted on output line V0 to enable the output ports to determine when the data packets begin and end. Consistent with the ANSI standard X379(FDDI) "4B5B" encoding system, encoder 54 converts each incoming 4-bit nibble into a 5-bit output value as illustrated in Table II.

TABLE II

| NIBBLE | 4B5B |
|--------|-------|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

Since only 16 of the 32 possible combinations of the five bits of a 4B5B code are needed to represent the sixteen possible values of a 4-bit nibble, the remaining 16 combinations of 4B5B code are available for other purposes. Table III below lists how the network switch of the present invention uses the remaining 16 4B5B codes.

TABLE III

| 4B5B | NAME | FUNCTION |
|------|------|----------|
| 00000 | Q | No Operation |
| 11111 | I | Idle |
| 00100 | H | No Operation |
| 11000 | J | Packet Start 1 |
| 10001 | K | Packet Start 2 |
| 01101 | T | End of Packet |
| 00111 | R | No Operation |
| 11001 | S | No Operation |
| 00001 | V | Violation |
| 00011 | V | Violation |
| 00010 | V | Violation |
| 00101 | V | Violation |
| 00110 | V | Violation |
| 01000 | V | Violation |
| 01100 | V | Violation |
| 10000 | CR | Con. Req. Start |

The CR code is used to identify the start of a connection request. The Q, H, R and S codes are ignored when they appear in a 4B5B encoded data stream. The T code indicates the end of a 4B5B encoded data packet. The I, J, K and V codes are used to synchronize transmission and receipt of 4B5B encoded data streams in the manner described below.

Output Port

Figure 3:
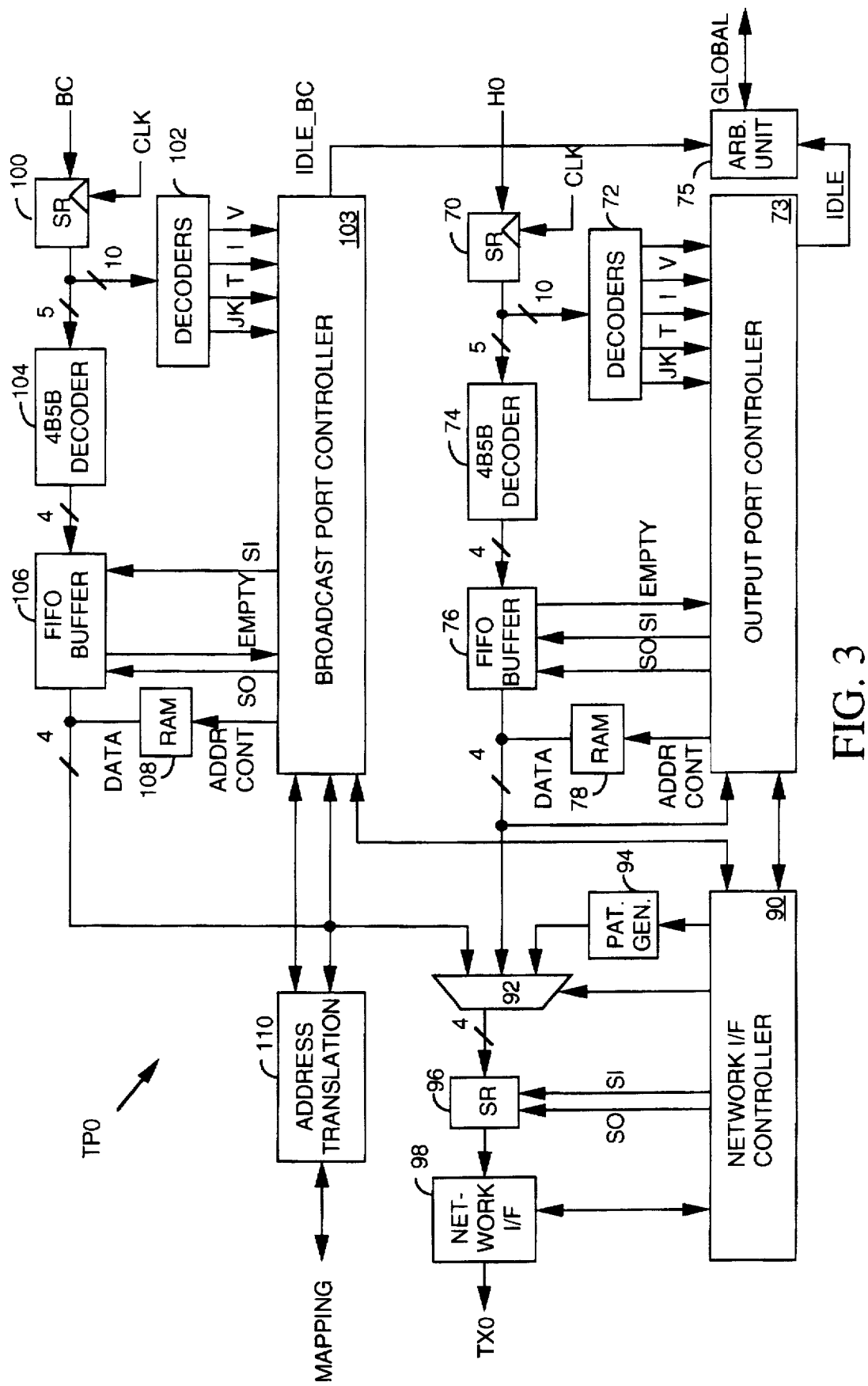
FIG. 3 illustrates an output port of FIG. 2 in more detailed block diagram form.

FIG. 3 illustrates output port TP0 of FIG. 1 in more detailed block diagram form. Output ports TP1–TP23 are similar. Output port TP0 includes a 10-bit serial-in, parallel-out shift register 70 clocked by the system clock signal CLK for receiving and storing data bits arriving on the H0 line. A set of decoders 72 signal an output port controller 73 when the five data bits stored longest in shift register 70 represent the I, V, T or JK 4B5B codes of Table II above or when all ten bits in shift register 70 represent the J and K codes in succession. A 4B5B decoder 74 converts the longest stored 5-bit value into the corresponding 4-bit nibble and passes it to the input of a FIFO buffer 76.

Figure 4:
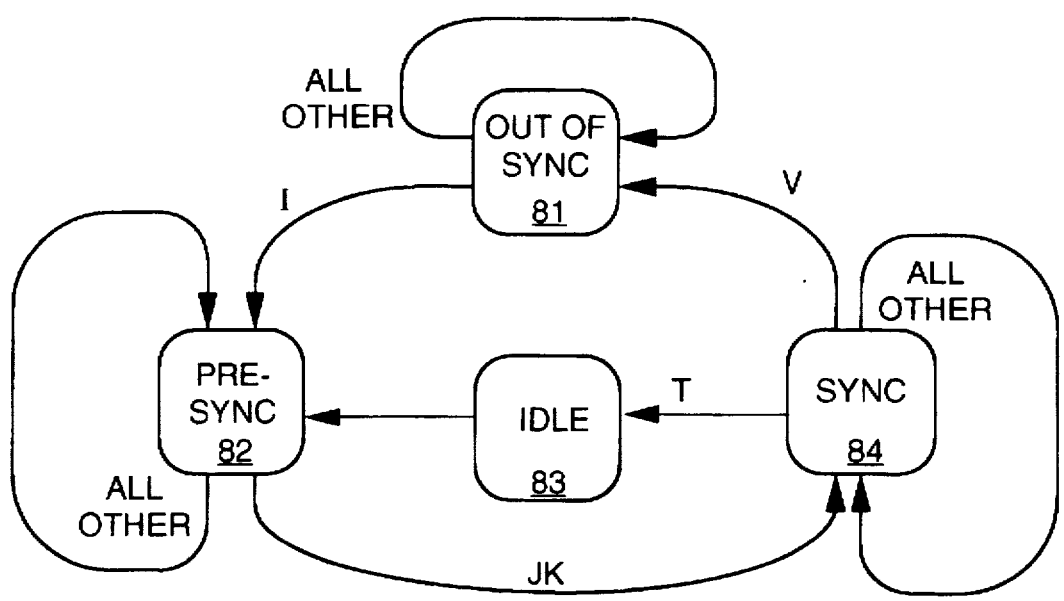
FIG. 4 is a state diagram illustrating an operation of the broadcast port controller 103 of FIG. 3.

FIG. 4 is state diagram illustrating a synchronization process carried out by input controller 73 of FIG. 4. Input controller 73 begins in an "out-of-sychronization" state 81. Controller 73 remains in state 81 until decoder 72 detects the I (idle) signal. At that point controller 73 moves to a "pre-synchronization" state 82. When decoder 72 signals detection of successive J and K symbols (indicating start of a data packet) controller 74 waits 10 cycles of the CLK signal to clear the J and K symbols from shift register 70 and then switches to a SYNC state 84 wherein it asserts an SI signal on every 5th pulse of the system clock signal to load each nibble of the incoming packet into FIFO buffer 76. If decoder 72 detects the T code indicating end of packet, controller 73 pulses an IDLE signal supplied to an arbitration unit 75 (state 83) and then returns to state 84. If decoder 72 detects the V code controller 73 reverts to the out-of-synchronization state 81.

Referring again to FIG. 3, when FIFO buffer 76 signals it is not empty, controller 73 shifts data out of FIFO buffer 76 onto a 4-bit data input/output bus of a random access memory (RAM) 78. Controller 73 then supplies address and control signals to RAM 78 causing it to store the 4-bit nibble. Controller 73 uses RAM 78 as a large FIFO buffer for assembling and storing each data packet until it can be transmitted outward to the destination station. Controller 73 maintains a count of packet bytes received and stored in RAM 78 and reads the length field in the packet header as it arrives in RAM 78 to determine the length of the packet. When the packet is fully loaded into RAM 78 controller 73 signals a network interface controller 90.

Controller 90 controls transmission of data packets outward to the destination station on bus TX0. When controller 90 is ready to forward a packet stored in RAM 78 it switches a multiplexer 92 to select the output of a pattern generator 94 and signals generator 94 to produce a sequence of 4-bit nibbles forming standard Ethernet protocol PREAMBLE and START data packet fields. Multiplexer 92 passes each nibble to a parallel- in/serial-out shift register 96 controlled by controller 90. Shift register 96 passes the data in serial form to a conventional Ethernet interface circuit 98 which forwards the data outward on the TX0 bus to the network station. After the PREAMBLE and START fields have been forwarded through multiplexer 92, controller 90 signals controller 73 to begin sequentially reading 4-bit packet data out of RAM 78 and passing them through multiplexer 92 and shift register 96 to interface circuit 98 for transmission to the destination station. When controller 73 has read out the last nibble of a packet, it signals controller 90.

Output port TP0 also includes a shift register 100, decoders 102 and 104, a broadcast port controller 103, FIFO buffer 106 and RAM 108 which independently process broadcast packets arriving on broadcast bus BC in substantially the same way corresponding devices 70, 72, 74, 73, 76 and 78 process unicast packets arriving on the H0 line. However, before signaling network controller 90 that a packet stored in RAM 108 is ready to be forwarded, controller 103 sends a copy of the source station's network address included in the stored packet header to an address translation unit 110. Address translation unit 110 sends the source network address and the ID of output port TP0 to mapping system 26 (FIG. 1) via the MAPPING bus. The address mapping system determines if the network station connected to port TP0 exists and is within the same virtual network as the source network station. If the network station does not exist or is not a valid destination station for the packet source, address translation unit 110 signals controller 103 and controller 103 discards the packet without forwarding it. If the station connected to port TP0 is a valid destination for the packet, address translation unit 110 signals controller 103. Controller 103 then signals network interface controller 90 that it is ready to forward a packet to the network station. Thereafter controllers 90 and 103 forward the broadcast packet from RAM 108 to the TX0 bus in the same manner controllers 90 and 73 forward unicast packets from RAM 78. When RAMS 78 and 108 both store packets to be forwarded, controller 90 alternately forwards them.

An arbitration unit 75 communicates with the arbitration sequencer 22 of FIG. 1 via the GLOBAL bus. Arbitration unit 75 receives an IDLE signal pulse after decoder 72 detects receipt of the end of a unicast packet. When arbitration unit circuit 75 is polled by arbitration sequencer 22 it signals the arbitration sequencer that output port TP0 has become idle and is no longer receiving a unicast packet on line H0. Controller 103 pulses an IDLE_BC signal to arbitration unit 75 when decoder 102 detects the end of a broadcast packet. This causes arbitration unit 75 to pulse an interrupt line of the GLOBAL bus to tell arbitration sequencer 22 that the BC line is now idle.

Address Translation

Figure 5:
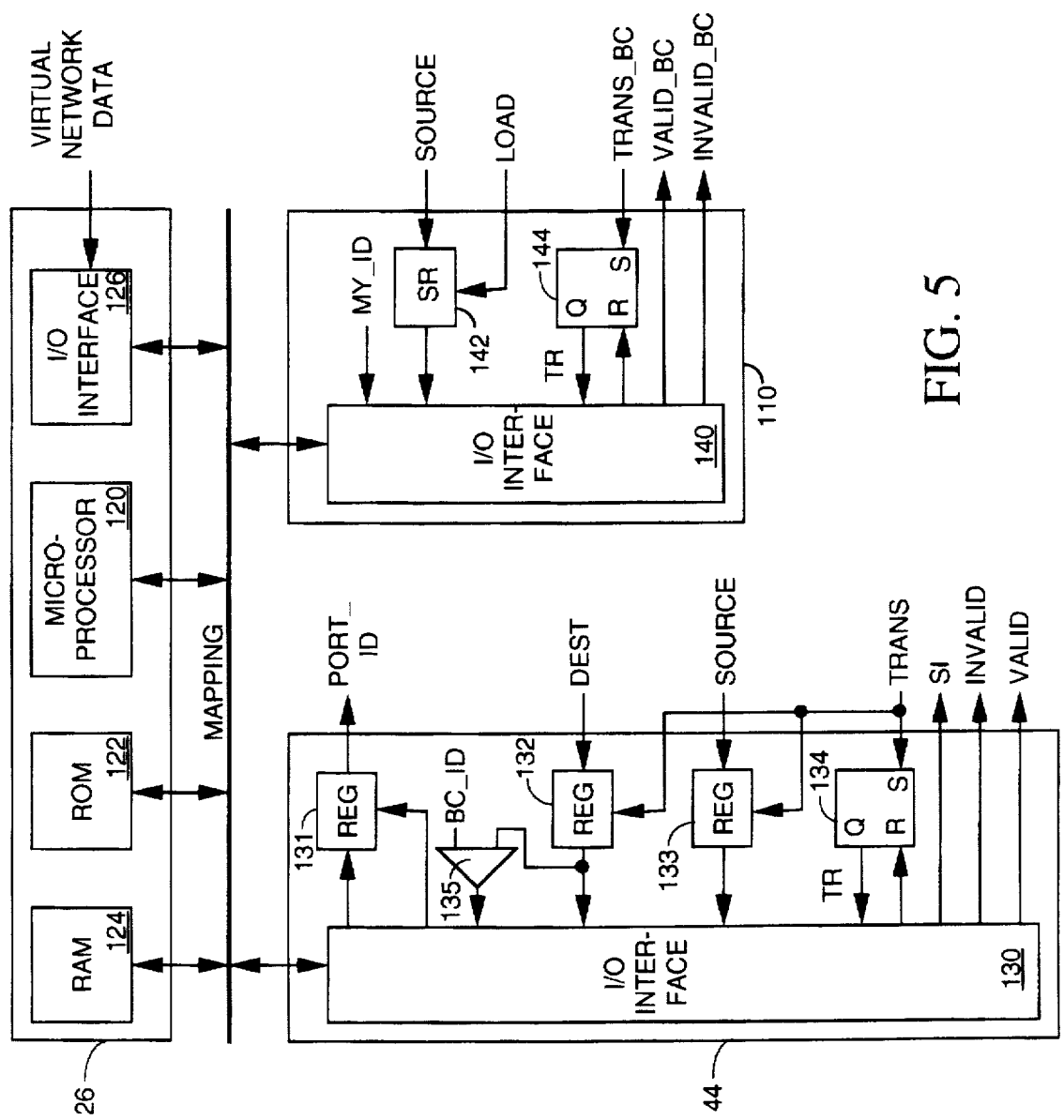
FIG. 5 illustrates an address mapping system employed by the network switch of FIG. 1 in block diagram form.

FIG. 5 illustrates in more detailed block diagram form, the address mapping system 26 of FIG. 1, an input port address translation unit 44 of FIG. 2 and an output address translation unit 110 of FIG. 3 interconnected by the MAPPING bus. Only one input port address translation unit 44 and one output port translation unit 110 are shown, but there are actually 24 of each type connected in parallel to the MAPPING bus, one for each input port and one for each output port.

Mapping system 26 includes a conventional microprocessor 120 operating under control of a firmware in a ROM 122 and accessing a RAM 124. Microprocessor 120, ROM 122, RAM 124 and an I/O interface circuit 126 are linked through the MAPPING bus. Microprocessor 120 maintains two tables in RAM 124. A first table relates input/output port ID to network address and a second table assigns network addresses into virtual networks. The mapping system builds the port ID/network address table from data it receives from the input arbitration units 44 as packets arrive at the input ports. A network supervisor supplies the virtual network mapping table via I/O interface circuit 126.

The input port address translation unit 44 includes a bus I/O interface circuit 130, a set of registers 131-133, a flip-flop 134, and a comparator 135. When the source address (SOURCE) and destination address (DEST) fields of a unicast packet arriving at an input port are available to unit 44, buffer controller 34 of FIG. 2 pulses a TRANS signal causing them to be loaded into registers 132 and 133. The TRANS signal pulse also sets flip-flop 134. Microprocessor 120 periodically polls translation unit 44 by checking the Q output of flip-flop 134. This tells microprocessor 120 that unit 44 has a pending mapping request. Microprocessor 120 responds by asking interface circuit 130 to forward the SOURCE and DEST data in registers 132 and 133 as well as the ID (MY_ID) of the port in which unit 44 resides. Microprocessor 120 updates the mapping table to relate the port identified by MY_ID to the network SOURCE address. It then determines from the virtual network assignment table in RAM 124 whether the port identified by the DEST address is a valid destination port for a packet from the SOURCE port. If the destination port is not valid, microprocessor 120 signals interface 130 to reset flip-flop 134 and to send an INVALID pulse to buffer controller 34 of FIG. 2 telling it to discard the packet. If the destination port is valid, microprocessor 120 sends the port ID (PORT_ID) of the destination port to interface circuit 130 which stores it in register 31. Interface circuit 130 then resets flip-flop 134 and sends a VALID signal pulse to controller 34 of FIG. 2 to tell it that it may forward the packet when ready, and sends an SI pulse to FIFO buffer 45 of FIG. 2 telling it to load the PORT_ID.

Comparator 135 of address translation unit 44 compares the DEST field stored in register 132 to the broadcast line ID (BC_ID) and signals interface circuit 130 when the incoming packet is a broadcast or multicast packet. In such case, interface circuit 130 resets flip-flop 134, stores the broadcast line ID in register 131 and pulses the SI and VALID signals to initiate a connection request for the broadcast line and to inform the input port that it may forward the broadcast/multicast packet. With flip-flop 134 reset, mapping system takes no action when it next polls translation unit 44.

Output port address translation unit 110 includes an I/O interface circuit 140, a shift register 142 and a flip-flop 144. When a broadcast packet is stored in RAM 108 of FIG. 3, broadcast port controller 103 of FIG. 3 loads a copy of the source address included in into shift register 142 and then pulses a TRANS_BC signal to set flip-flop 114. Mapping system 26 periodically polls unit 110 and the Q output of flip-flop 144 tells mapping system 26 that a mapping request is pending. Microprocessor 120 obtains the SOURCE address from register 142 and the port ID (MY_ID) of the output port in which unit 110 resides and uses its mapping and virtual network tables to determine whether the output port is a valid destination port and is included in the same virtual network as station indicted by the SOURCE address. If the destination port is not a valid destination for the broadcast packet, mapping system 26 signals interface 140 to reset flip-flop 144 and to send an INVALID_BC pulse to controller 103 FIG. 3 telling it to discard the packet. If the destination port is valid, mapping system 26 signals interface circuit 130 to reset flip-flop 134 and to send a VALID_BC signal pulse to controller 103 of FIG. 3 to tell it that it may forward the packet when ready.

Arbitration System

Figure 6:
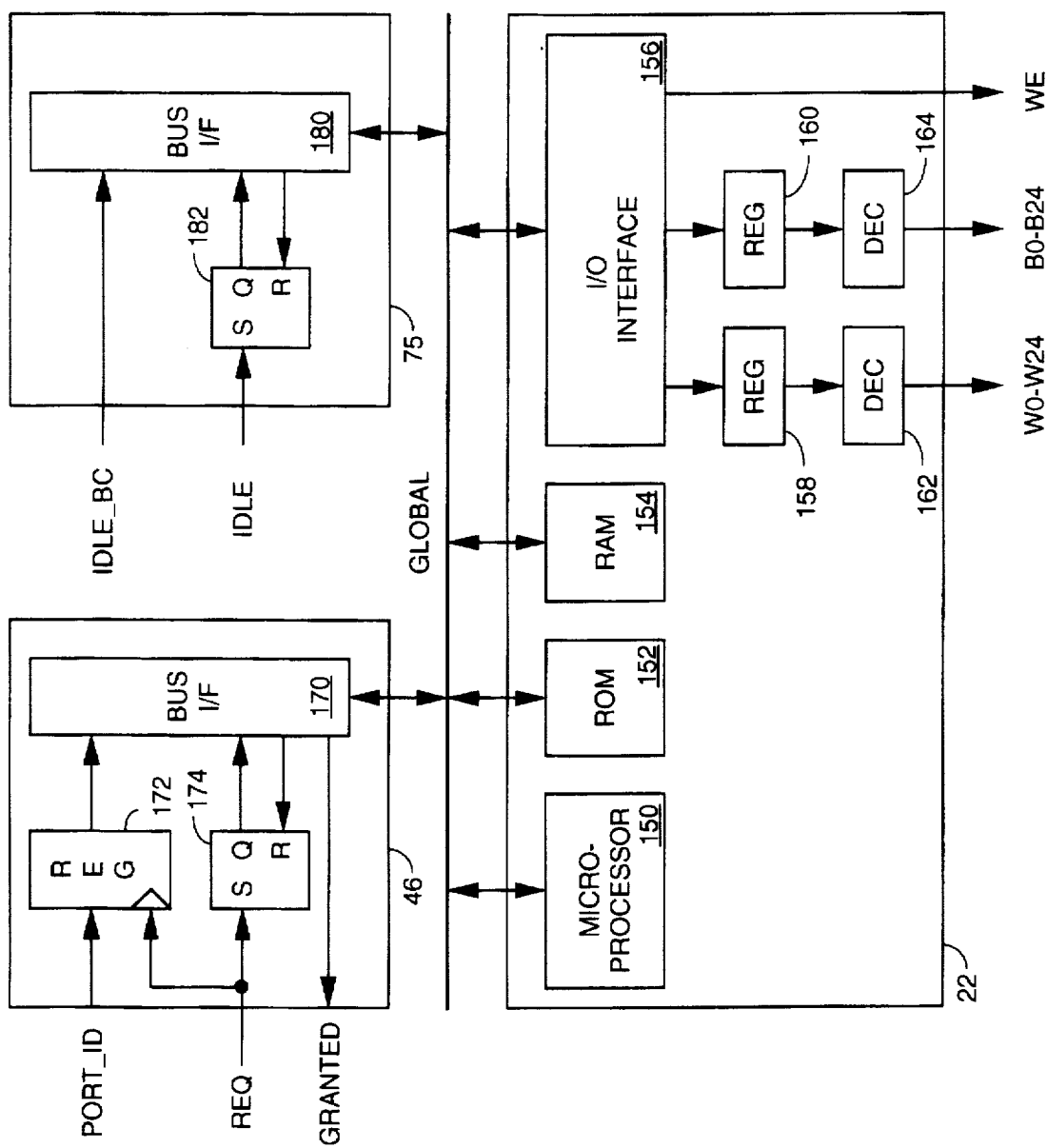
FIG. 6 illustrates in block diagram form an arbitration system employed by the network switch of FIG. 1.

FIG. 6 illustrates in more detailed block diagram form, the arbitration sequencer 22 (FIG. 1), an input port arbitration unit 46 (FIG. 2) and an output port arbitration unit 75 (FIG. 3), all interconnected by the GLOBAL bus. Although only one input port arbitration unit 46 and one output port translation unit 75 are shown, there are actually 24 of each type connected in parallel to the GLOBAL bus, one for each input port and one for each output port.

Sequencer 22 includes a microprocessor 150 operating under control of firmware stored in a ROM 152 and using a RAM 154 for temporary data storage. Microprocessor 150, ROM 152, RAM 154, and I/O interface circuit 156 and all input and output ports are linked by the GLOBAL bus. Sequencer 22 maintains two tables in RAM 154. One table lists pending requests from the input ports RP0–RP23 and indicates the input and output ports to be connected. The other table indicates which of output ports TP0–TP23 are currently idle and also whether the broadcast line BC is idle. Sequencer 22 periodically polls the input port arbitration units 44 to determine if they have a new connection request and polls the output port arbitration units 110 to determine which output ports have finished receiving a unicast packet. The output port arbitration units all concurrently send an interrupt signal to microprocessor 150 via an interrupt line of the GLOBAL bus when the broadcast line BC has become idle.

The input port arbitration unit 46 includes a bus interface circuit 170, a register 172 and a flip-flop 174. When state machine 50 (FIG. 2) transmits a REQ signal pulse to arbitration unit 46 to signal that it has a new connection request, the REQ signal sets flip-flop 174 and loads the ID (PORT_ID) of the requested port or broadcast line into register 172. Later, when arbitration sequencer 22 polls arbitration unit 46, it checks the Q output of flip-flop 174 to determine if a new request is pending and then resets the flip-flop. If a new request is pending, microprocessor 150 acquires the ID of the requested output port (PORT_ID) from register 172. Microprocessor 150 then checks the list of idle output ports in RAM 154 to determine if the requested output port or broadcast line is idle. If the requested port or BC line is not idle, microprocessor 150 adds the request to the pending request table. If the requested output port or broadcast line is idle, microprocessor 150 updates the idle port table to indicate that the requested output port or broadcast line is no longer idle, and sends the request output port ID to a register 158 and the requesting input port ID to a register 160 via interface circuit 156.

A decoder 162 within sequencer 22 decodes the output port or BC line ID in register 158 and asserts one of the W0–W23 lines to RAM 14 of FIG. 1. A decoder 164 decodes the input port ID in register 160 to assert one of bit lines B0–B23 and deassert the remaining bit lines. Thereafter microprocessor 150 signals interface circuit 150 to pulse the write enable line WE to RAM 14 of FIG. 1. RAM 14 stores the B0–B23 data word at the memory location indicated by the asserted W0–W23 bit, causing crosspoint switch 12 of FIG. 1 to make the connection between the requesting input port and the requested output port or BC line and to break any previous connection to the output port or BC line. Thereafter microprocessor 150 signals the bus interface circuit 170 of the requesting input port that the request has been granted. Interface circuit 170 then pulses the GRANTED signal to the input port's state machine 50 (FIG. 2).

The output port arbitration unit 75 includes a bus interface circuit 180 and a flip-flop 182. When controller 103 of FIG. 3 pulses the IDLE_BC signal to indicate the end of broadcast packet transmission on the BC line, that signal tells interface circuit 180 to send an interrupt to microprocessor 150 via an interrupt lien of the GLOBAL bus to indicate that the BC line is now idle. When controller 73 of FIG. 3 pulses the IDLE signal to signal the end of a unicast packet arriving on the HO line, the IDLE signal pulse sets flip-flop 182. Thereafter, when the arbitration sequencer 22 polls the output port, it checks the Q output of flip-flop 182 to determine if the port is newly idle. If so, it resets the flop-flop. When it microprocessor 150 receives an indication that an output port TP0-TP23 or the BC line has become idle, it checks the pending request list to determine if any input port has a pending request for the newly idle output port or BC line. If so it grants the request by sending the input port and requested output port or BC line IDs to registers 158 and 160, and telling interface circuit 156 to pulse the write enable signal WE. The microprocessor 150 then sends a GRANTED message to the requesting input port via the global bus. If there are no pending requests for the newly idle output port or BC line, microprocessor 150 simple updates the idle port list to indicate the output port or BC line is now idle.

Thus has been described a local area network switch including input and output ports for receiving and forwarding broadcast and unicast data transmissions between network stations and a crosspoint switch for selectively routing data transmissions between the input and ports. Since each output port has separate links to the crosspoint switch for receiving unicast and broadcast transmissions, the switch can concurrently route broadcast and unicast packets to each output port. Thus broadcast packet transmission through the crosspoint switch does not delay unicast packet transmission and unicast transmission to one or more output ports does not delay concurrent broadcast transmission to all output ports.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for routing unicast and broadcast data transmissions between network stations, wherein each unicast data transmission is directed to a selected one of said network stations and wherein a broadcast data transmission is directed to a plurality of said network stations, the network switch comprising:

routing means including a plurality of input lines for receiving unicast and broadcast data transmissions, a plurality of output lines, and a broadcast line, for selectively routing a unicast data transmission arriving on any one of said input lines to any one of said output lines and for routing a broadcast data transmission arriving on any one of said input lines to said broadcast line;

a plurality of input ports each connected to a corresponding one of said input lines and to a corresponding one of said network stations for receiving unicast and broadcast data transmissions from the corresponding network station and for forwarding the received data transmissions to said routing means via the corresponding input line; and a plurality of output ports, each connected to a corresponding one of said output lines for receiving unicast data transmissions routed thereto by said routing means, each connected to said broadcast line for receiving broadcast data transmissions routed thereto by said routing means, and each forwarding received unicast and broadcast data transmissions to a corresponding one of said network stations wherein each of said output ports comprises means connected to the broadcast line and to the output port's corresponding output line for concurrently receiving and storing broadcast and unicast data transmissions routed thereto.

2. The network switch in accordance with claim 1 wherein each unicast data transmission includes routing data indicating a network station to which the unicast data transmission is directed and wherein each input port comprises:

means for receiving and storing unicast and broadcast data transmissions from its corresponding network station;

means for requesting said routing means to route each unicast transmission to one of said output lines determined in accordance with the routing data included in the data transmission and for requesting said routing means to route each broadcast transmission to said broadcast line, and means for forwarding the directed and broadcast transmissions to said routing means via the input port's corresponding input line.

3. The network switch in accordance with claim 2 wherein each of said output ports further comprises:

means connected to the output port's corresponding network station for sequentially forwarding stored broadcast and unicast data transmissions to the corresponding network station.

4. A network switch for routing both unicast and broadcast data transmissions between a plurality of network stations, wherein each unicast data transmission is directed to a particular destination network station and wherein a broadcast data transmission is directed to all of said network stations, the network switch comprising:

a plurality of input ports, each connected to a corresponding one of said network stations for receiving both unicast and broadcast data transmissions from its corresponding network station;

a plurality of output ports, each connected to a corresponding one of said network stations for forwarding both unicast and broadcast transmissions to its corresponding network station; and data transmission routing means interconnecting said input ports and said output ports for routing data transmissions there between, each input port sequentially forwarding received unicast and broadcast data transmissions to said routing means, said routing means routing a unicast data transmission received from any input port only to the output port corresponding to the unicast data transmission's destination station, said routing means concurrently routing broadcast data transmissions received from any input port to all of said output ports, wherein each output port includes means for concurrently receiving both unicast and broadcast data transmissions from said data transmission routing means and for sequentially forwarding them to the output port's corresponding network station.

5. The network switch in accordance with claim 4 wherein said routing means comprises:

a plurality of vertical conductors, each connected to a separate one of said input ports for conveying unicast and broadcast data transmissions there from;

a plurality of horizontal conductors, each connected to a separate one of said output ports for conveying unicast data transmissions thereto;

a broadcast conductor connected to each of said output ports for conveying broadcast transmissions thereto; and means for selectively connecting any one of said vertical conductors to any one of said horizontal conductors for conveying unicast transmissions therebetween and for selectively connecting any one of said vertical conductors to said broadcast conductor for conveying broadcast transmissions therebetween.

6. The network switch in accordance with claim 4 wherein each of said network stations has a corresponding address, wherein each of said unicast transmissions includes an address of a destination network station to which the transmission is directed, wherein each of said broadcast transmissions includes routing data identifying the broadcast transmission as a broadcast transmission, and wherein each input port comprises:

means for receiving and storing both unicast and broadcast data transmissions from its corresponding network station;

means for reading the destination network station address included in each received unicast transmission and for requesting said routing means to route the received unicast transmission to an output port corresponding to the destination network station, for reading the routing data included in each received broadcast transmission and for requesting said routing means to concurrently route the received broadcast transmission to all of said output ports; and means connected to said routing means for forwarding the stored unicast and broadcast transmissions to said routing means.

7. The network switch in accordance with claim 6 wherein said routing means comprises a plurality of vertical conductors, each connected to a separate one of said input ports for conveying unicast and broadcast data transmissions there from;

a plurality of horizontal conductors, each connected to a separate one of said output ports for conveying unicast data transmissions thereto;

a broadcast conductor connected to each of said output ports for conveying broadcast transmissions thereto; and means responsive to requests from said input ports for selectively interconnecting pairs of said vertical and horizontal conductors for conveying unicast transmissions therebetween and for selectively interconnecting said vertical conductors to said broadcast conductor for conveying broadcast transmissions therebetween.

8. The network switch in accordance with claim 7 wherein each of said output ports comprises:

means for receiving and storing a unicast data transmission routed thereto on one of said horizontal conductors;

means for receiving and storing a broadcast data transmission routed thereto on said broadcast line; and means for sequentially forwarding the stored unicast and broadcast data transmissions to the output port's corresponding network station.

9. The network switch in accordance with claim 7 wherein each of said network stations has a corresponding address;

wherein each input and output port is identified by a port identification code (a port ID);

wherein each of said unicast transmissions includes an address of a destination network station to which the transmission is directed;

wherein each of said broadcast transmissions includes routing data identifying the broadcast transmission as a broadcast transmission, and wherein the network switch further comprises address translation means connected to each input port for receiving network addresses therefrom and returning to said input port the port ID of the output port corresponding to the received network address; and wherein each of said input ports comprises:

means for receiving and storing both unicast and broadcast data transmissions from its corresponding network station;

means for transmitting the destination network station address included in each received unicast transmission to said address translation means, for receiving therefrom a corresponding output port ID, for requesting said routing means to route the received unicast transmission the output port identified by the output port ID, for reading the routing data included in each received broadcast transmission and for requesting said routing means to concurrently route the received broadcast transmission to all of said output ports; and means connected to said routing means for forwarding the stored unicast and broadcast transmissions to said routing means.

10. The network switch in accordance with claim 9 wherein said routing means comprises a plurality of vertical conductors, each connected to a separate one of said input ports for conveying unicast and broadcast data transmissions there from;

a plurality of horizontal conductors, each connected to a separate one of said output ports for conveying unicast data transmissions thereto;

a broadcast conductor connected to each of said output ports for conveying broadcast transmissions thereto; and means for responding to requests from said input ports by conveying unicast transmissions between selected pairs of said horizontal and vertical conductors and by conveying broadcast transmissions from selected ones of said vertical conductor to said broadcast conductor.

11. The network switch in accordance with claim 10 wherein each of said output ports comprises:

means for receiving and storing a unicast data transmission routed thereto on one of said horizontal conductors;

means for receiving and storing a broadcast data transmission routed thereto on said broadcast line; and means for sequentially forwarding the stored unicast and broadcast data transmissions to the output port's corresponding network station.

12. A network switch for routing both unicast and broadcast data transmissions between a plurality of network stations grouped into a plurality of separate virtual networks, wherein each unicast data transmission is directed to a particular destination network station and wherein a broadcast data transmission transmitted by a network station of any virtual network is directed to all network stations of that virtual network only, the network switch comprising:

a plurality of input ports, each connected to a corresponding one of said network stations for receiving both unicast and multicast data transmissions from its corresponding network station;

a plurality of output ports, each connected to a corresponding one of said network stations for forwarding both unicast and broadcast transmissions to its corresponding network station; and routing means interconnecting said input ports and said output ports for routing data transmissions there between, wherein each input port sequentially forwards received unicast and broadcast data transmissions to said routing means, wherein said routing means routes a unicast data transmission received from any input port only to the output port corresponding to the unicast data transmission's destination station, wherein said routing means concurrently routes broadcast data transmissions received from any input port to all of said output ports, and wherein each output port includes means for concurrently receiving both unicast and broadcast data transmissions from said data transmission routing means, for forwarding received unicast data transmissions to the output port's corresponding network station, for forwarding to the corresponding network station only those received broadcast data transmissions transmitted by network stations grouped in a virtual network with the corresponding network station, and for discarding without forwarding all other received broadcast data transmissions.

13. The network switch in accordance with claim 12 wherein said routing means comprises:

a plurality of vertical conductors, each connected to a separate one of said input ports for conveying unicast and broadcast data transmissions therefrom;

a plurality of horizontal conductors, each connected to a separate one of said output ports for conveying unicast data transmissions thereto;

a broadcast conductor connected to each of said output ports for conveying broadcast transmissions thereto; and means for selectively connecting any one of said vertical conductors to any one of said horizontal conductors for conveying unicast transmissions therebetween and for selectively connecting any one of said vertical conductors to any one of said horizontal conductors for conveying broadcast transmissions therebetween.

14. The network switch in accordance with claim 12 wherein each of said network stations has a corresponding network address, wherein each of said unicast transmissions includes an address of a destination network station to which the transmission is directed and an address of a source network station from which the transmission originated, wherein each of said broadcast transmissions includes routing data identifying the broadcast transmission as a broadcast transmission, and wherein each input port comprises:

means for receiving and storing both unicast and broadcast data transmissions from its corresponding network station;

means for reading the destination network station address included in each received unicast transmission and requesting said routing means to route the received unicast transmission to an output port corresponding to the destination network station, and for reading the routing data included in each received broadcast transmission and requesting said routing means to concurrently route the received broadcast transmission to all of said output ports; and means connected to said routing means for forwarding the stored unicast and broadcast transmissions to said routing means.

15. The network switch in accordance with claim 12 wherein said routing means comprises a plurality of vertical conductors, each connected to a separate one of said input ports for conveying unicast and broadcast data transmissions there from;

a plurality of horizontal conductors, each connected to a separate one of said output ports for conveying unicast data transmissions thereto;

a broadcast conductor connected to each of said output ports for conveying broadcast transmissions thereto; and means responsive to requests from said input ports for selectively interconnecting pairs of said vertical and horizontal conductors for conveying unicast transmissions therebetween and for selectively interconnecting said vertical conductors to said broadcast conductor for conveying broadcast transmissions therebetween.

19

16. The network switch in accordance with claim 15 wherein each of said output ports comprises:

means for receiving and storing a unicast data transmission routed thereto on one of said horizontal conductors;

means for receiving and storing a broadcast data transmission routed thereto on said broadcast line; and means for sequentially forwarding the stored unicast and broadcast data transmissions to the output port's corresponding network station.

17. The network switch in accordance with claim 12 wherein each of said network stations has a corresponding address;

wherein each input and output port is identified by a port identification code (port ID);

wherein each of said unicast transmissions includes an address of a destination network station to which the transmission is directed;

wherein each of said broadcast transmissions includes routing data identifying the broadcast transmission as a broadcast transmission, and wherein the network switch further comprises address translation means connected to each input port for receiving network addresses therefrom and returning to said input port the port ID of the output port corresponding to the received network address; and wherein each of said input ports comprises:

means for receiving and storing both unicast and broadcast data transmissions from its corresponding network station;

means for transmitting the destination network station address included in each received unicast transmission to said address translation means, for receiving therefrom a corresponding output port ID, for requesting said routing means to route the received unicast trans-

20 mission the output port identified by the output port ID, for reading the routing data included in each received broadcast transmission and for requesting said routing means to concurrently route the received broadcast transmission to all of said output ports; and means connected to said routing means for forwarding the stored unicast and broadcast transmissions to said routing means.

18. The network switch in accordance with claim 17 wherein said routing means comprises a plurality of vertical conductors, each connected to a separate one of said input ports for conveying unicast and broadcast data transmissions there from;

a plurality of horizontal conductors, each connected to a separate one of said output ports for conveying unicast data transmissions thereto;

a broadcast conductor connected to each of said output ports for conveying broadcast transmissions thereto; and means for responding to requests from said input ports by conveying unicast transmissions between selected pairs of said horizontal and vertical conductors and by conveying broadcast transmissions from selected ones of said vertical conductor to said broadcast conductor.

19. The network switch in accordance with claim 18 wherein each of said output ports comprises:

means for receiving and storing a unicast data transmission routed thereto on one of said horizontal conductors;

means for receiving and storing a broadcast data transmission routed thereto on said broadcast line; and means for sequentially forwarding the stored unicast and broadcast data transmissions to the output port's corresponding network station.

\* \* \* \* \*